(12) United States Patent
Reime

(10) Patent No.: US 9,817,146 B2
(45) Date of Patent: Nov. 14, 2017

(54) METHOD AND DEVICE FOR MEASURING DISTANCES BY MEANS OF INDUCTIVE SENSORS

(71) Applicant: Gerd Reime, Buhl (DE)

(72) Inventor: Gerd Reime, Buhl (DE)

(*) Notice: Subject to any disclaimer, the term of this patent is extended or adjusted under 35 U.S.C. 154(b) by 0 days.

(21) Appl. No.: 15/225,316

(22) Filed: Aug. 1, 2016

(65) Prior Publication Data

US 2016/0341536 A1 Nov. 24, 2016

Related U.S. Application Data

(63) Continuation-in-part of application No. 12/021,848, filed on Jan. 29, 2008, now abandoned, which is a continuation of application No. PCT/EP2006/007550, filed on Jul. 29, 2006.

(30) Foreign Application Priority Data

Jul. 29, 2005 (DE) .................. 10 2005 036 354
Sep. 27, 2005 (DE) .................. 10 2005 045 993
Dec. 14, 2005 (DE) .................. 10 2005 063 023

(51) Int. Cl.
G01B 7/14 (2006.01)
G01V 3/10 (2006.01)
H01F 38/14 (2006.01)
G01B 7/02 (2006.01)

(52) U.S. Cl.
CPC .............. G01V 3/10 (2013.01); G01B 7/023 (2013.01); G01B 7/14 (2013.01); H01F 38/14 (2013.01)

(58) Field of Classification Search
CPC . G01B 7/23; G01B 7/003; G01B 7/02; G01B 7/023; G01D 5/20; G01D 5/204; G01D 5/2046; G01D 5/2053; G01D 5/2066; G01D 5/207; G01D 5/2086; G01D 5/22; G01D 5/225; G01D 5/2258; G01D 5/2275; G01D 5/2073; G01R 33/00; G01R 33/02; G01R 33/0206; G01V 3/10; H01F 38/14
USPC ..................... 324/207.17, 207.26
See application file for complete search history.

(56) References Cited

U.S. PATENT DOCUMENTS

| | | | |
|---|---|---|---|
| 4,300,097 | A | 11/1981 | Turner |
| 4,322,727 | A | 3/1982 | Zabler et al. |
| 4,677,490 | A | 6/1987 | Levine et al. |
| 4,806,848 | A | 2/1989 | Demers et al. |
| 5,136,250 | A | 8/1992 | Abdelli et al. |

(Continued)

Primary Examiner — David M. Schindler
(74) Attorney, Agent, or Firm — Cantor Colburn LLP

(57) ABSTRACT

Disclosed is method for measuring influence of or propagation time of inductive fields including producing and detecting a first inductive temporal field change and a first change value, producing and detecting a further inductive temporal field change and further field change, at least one of the changes being influenced by an object, comparing the first and further change values to produce a comparison value used to produce amplitude values such that amplitude of the first or further change value are substantially of the same magnitude, detecting a clock pulse alternation signal corresponding to the field change, determining a difference value by a comparison of the clock pulse alternation signals, changing the difference value to change phase delay of the first or further field change until the difference value is zero, using the phase delay to determine influence/propagation time of the inductive change.

2 Claims, 4 Drawing Sheets

(56) References Cited

U.S. PATENT DOCUMENTS

| | | |
|---|---|---|
| 6,348,862 B1 | 2/2002 | McDonnell et al. |
| 6,803,757 B2 | 10/2004 | Slates |
| 2002/0167439 A1 | 11/2002 | Bloch et al. |
| 2005/0162158 A1 | 7/2005 | Del Monte |
| 2008/0197835 A1* | 8/2008 | Reime .................... G01B 7/023 |
| | | 324/200 |

* cited by examiner

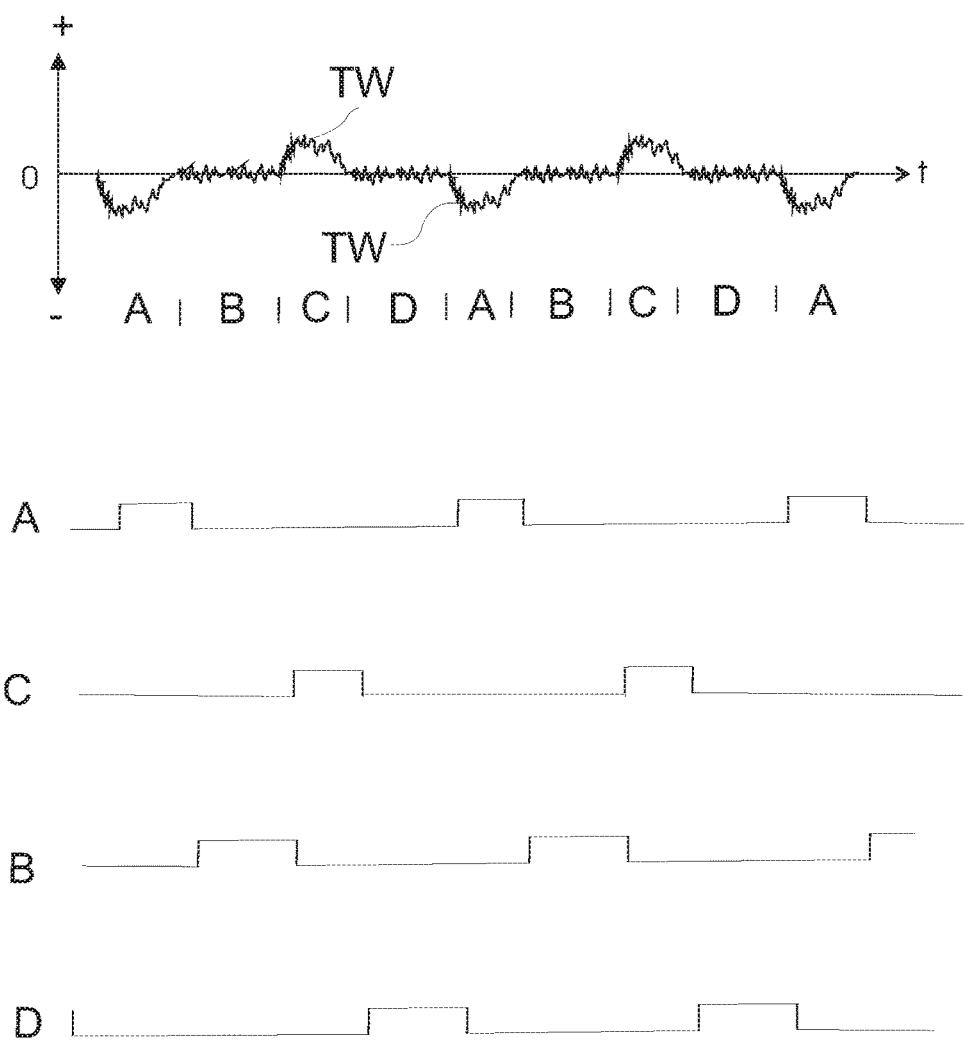
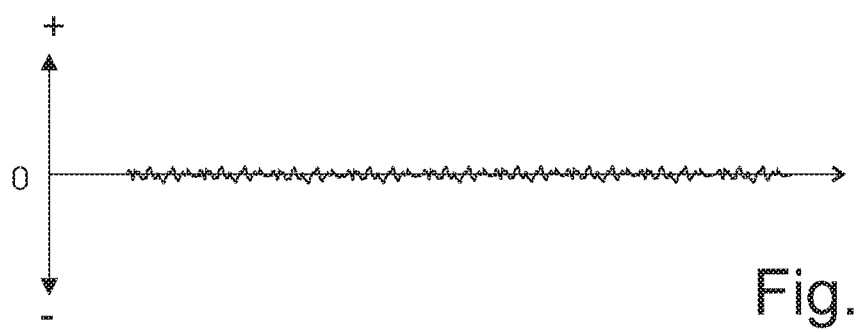
Fig. 2
Fig. 3

METHOD AND DEVICE FOR MEASURING DISTANCES BY MEANS OF INDUCTIVE SENSORS

CROSS REFERENCE TO RELATED APPLICATIONS

This application is a continuation-in-part of U.S. patent application Ser. No. 12/021,848 filed on Jan. 29, 2008, the entire contents of which are incorporated herein by reference. U.S. patent application Ser. No. 12/021,848 is a continuation of International Patent Application No. PCT/EP2006/007550 filed on 29 Jul. 2006, the entire contents of which are incorporated by reference herein. This application, by way of the cited PCT application, further claims the priority of the German Patent Applications 10 2005 036 354.7 filed on 29 Jul. 2005, and 10 2005 045 993.5 filed on 27 Sep. 2005, and 10 2005 063 023.5 filed on 14 Dec. 2005, the disclosure content whereof is hereby expressly incorporated into the subject matter of the present Application.

TECHNICAL FIELD OF THE INVENTION

The invention relates to a method and a device for the measurement of the influence of or the propagation time of field changes in inductive fields.

BRIEF DISCUSSION OF RELATED ART

The distance of a reference object relative to other objects needs to be determined in many fields of application. One such field of employment can, for example, be the detection of metallic articles in the soil or the approach of objects in the automotive field.

One possibility for measuring distances lies in the measurement of the light propagation time between a luminous radiation sending transmitter, an object reflecting this luminous radiation and a receiver. A solution of this type in the form of an optical distance sensor is known e.g. from DE 100 22 054 A1, wherein the phase shift between the transmitted and received rays of light is drawn upon for the measurement of the distance. To this end, the received signal having a minimum amplitude is supplied to a synchronous rectifier together with the voltage of an oscillator. Thus, a measuring signal originating from the light path is supplied to the inputs of the synchronous rectifier together with a purely electrically produced signal. The input signal is regulated by means of the output signal present at the output of the synchronous rectifier until such time as there is a change of prefix sign by controlling a delay member, until the average value of the two signals at the output is about zero. Hereby, the synchronous rectifier has the task of determining the phases of the signal very precisely. Component-related delays, aging and temperature effects are separately referenced and compensated. Even when a reference light path is used, the control process takes place electrically by influencing the delay member. Thereby, the photodiode signal and the purely electrically transmitted signal shifted through 90° or 270° are supplied to a classical synchronous rectifier for phase detection purposes. To this end, the signals before the synchronous rectifier are not equal to zero with the goal of keeping the respective signal sections of the received signal equally long.

From U.S. Pat. No. 4,806,848 a method for a capacitive measurement of the distance of turbine blades is known. The turbine blade is in the sensor-active region of a measuring sensor, the measured value of which is compared with a reference value. Measured value and reference value are passed to a phase detector in a clocked manner. The amplitude of the phase is measured at its output and a predetermined amplitude shift to a baseline is conducted by means of a fine adjustment. A separate amplitude control of the detected values out of the measuring path and the reference path to zero is not accomplished prior to the phase control. Similar devices are known from U.S. Pat. No. 4,677,490 A, U.S. Pat. No. 6,348,862 B1 and DE 21 58 320 A Furthermore, a method for measuring distances by a propagation time measurement process is known from WO 01/90778 A1, wherein the transmitted signal and the received signal present at the receiver are addressed at the same clock rate. The control signals determined in this way are shifted in such a manner by means of a phase shifter that the deviation in distance between the distance to the target object determined by means of the propagation time measurement and the actual distance becomes minimal. The goal is to optimize the sampling points with the propagation time at high frequencies.

From EP 706 648 B1 it is known to detect light signals between light emitters and light receptors whilst compensating for external influences such as stray light, temperature or aging effects. The light emitters are operated alternately and in time slots by a clock pulse generator. The light from at least one light path that has been regulated in amplitude is effective, possibly together with the light from a further light emitter such as e.g. an compensating light source, on the light receptor in such a way that there ensues a received signal without clock synchronous signal components. The received signal from the light receptor is supplied to a synchronous demodulator which breaks the received signal down again into the signal components corresponding to the two light sources. These are compared with one another in a comparator, whereby a signal corresponding to a zero state without stray light components is produced. If there is no signal corresponding to this zero state present at the output of the comparator, the radiating power that is supplied to the light sources is appropriately regulated until such time as this state is reached.

As an alternative to the measurement of the propagation time of light where this is not possible, in particular, in the case of media that are not permeable to light radiation, a distance measurement can take place if it is possible to capture the changes in an electrical field occurring as a result of the nearing, presence and/or distancing of an object affecting the field. Investigations have indicated that pulses, which lead to changes in such fields in that a change in the induction is produced, propagate at the speed of light, whereas the changes themselves take place more slowly in a temporal sense.

BRIEF SUMMARY OF THE INVENTION

On the basis of this state of the art, the invention provides alternative methods for the measurement of the influence of or the propagation time electrical fields.

The sending elements and the receivers that are selected are in the form of coils which interact with inductances in their surrounding or which are affected by objects that affect the field and thus the measuring circuit in a inductive manner. Self-evidently, other means could also be used for the production and detection of the electrical and/or magnetic fields. Thus, the principle of an optical balance known from EP 706 648 B1 can also be used for the measurement of the influence of or the propagation time of field changes of inductive fields.

Clocked signals from at least two coils which produce or send field changes are fed to the receiver. In the case of an inductive solution, the electrical field which was built up by the coils is altered e.g. by the object that is to be detected. This leads to a change in the inductivity which is measured in order to determine the distance/effect of the object. The field change of the inductive field is determined by a receiving coil. A compensation is effected by means of a compensation coil comprising an inductivity that is perceived by the receiving coil. The received signals and thus the change in values from the two measuring paths are compared with one another and regulated to provide a zero signal therebetween by means of an amplitude control and phase control process. The control values for the amplitude or phase control process, respectively, then correspond to the value of the inductivity respectively the propagation time needed to build up the inductivity.

To this end, the received signal of a clock cycle from the sending coil and the compensating coil is sub-divided into preferably say four equal sections. If the switch-on time of the sending coil is designated by the sections A and B and the switch-on time of the compensating coil by C and D, then first the sections B and D are regulated to produce a zero signal therebetween by means of the amplitude control process. Then the sections A and C are compared at this zero information signal and regulated to a zero signal to each other by means of an phase shift. The information in regard to the propagation time is contained in the sections A and C, and the information in regard to the influence of the field is contained in the sections B and D. The propagation time of the field changes in the inductive field and thus the distance between the coil and the object or the receiving coil can then be determined from the delay of the phase shifter.

In at least one embodiment, the received signal of a clock cycle from the sending coil and the compensating coil is sub-divided into four equal sections, for example. If the switch-on time of the sending coil is designated by the sections A and B and the switch-on time of the compensating coil by C and D, then the sections A and C are compared and regulated to produce the lowest possible differences therebetween by means of a phase shift process. The sections B and D are likewise regulated to produce the lowest possible differences therebetween by means of an amplitude control process. The information in regard to the propagation time is contained in the sections A and C, while the information in regard to the static capacitance or static influence of the field in the sections B and D. The propagation time of the field changes in the capacitive field and thus the distance between the affected coil (e.g., either the sending coil or the compensating coil) and the object (O) or the receiver coil can then be determined from the delay of the phase shifter.

The compensation process enables complete elimination of the clock synchronous signal components, i.e. only the actual amplifier noise remains. The amplifier can therefore have a very high amplification factor or could even be implemented as a high amplification limiter amplifier.

Thus, the clock pulse alternation signals occurring at a clock pulse alternation are detected and a difference value is determined therefrom which is minimized by means of a phase shifter to zero. The influence or the propagation time of field changes in inductive fields and thus the distance between the transmitter and the object or the receiving coil can be determined from the delay to the signal caused by the phase shifter. Due to the high amplification of the received signal—possible because of the amplitude control process—, the propagation time of the field appears clearly as a voltage peak at the clock pulse alternation. This peak arises at the respective clock rate of the sending coil and the compensating coil—depending upon the circuitry, at the latest at the comparators—with differing polarity with respect to the average value of the noise and arrives at two inputs of a comparator that are appropriately switched in synchronism with the clock rate in the corresponding time periods. The amplitude of this clock pulse alternation signal is dependent on the field propagation time, but as it relates merely to the minimization of the difference value, the difference value of the signal can be demodulated in amplitude from clock pulse to clock pulse in synchronism with the clock rate and any existing difference can be demodulated in synchronism with the clock rate and an existing difference can be used for the control of the phase shifter and for bringing this difference down to zero. Due to the clock rate, the time point for the occurrence of the clock pulse alternation signal is known so that only the peak needs to be detected there. At the same time, any arbitrary clock rate can be worked with.

Due to the two closed control loops for an amplitude control process on the one hand and a propagation time control process on the other hand, the following advantages are obtained:
very high sensitivity
very good propagation time measurement even at close range (to "0" distance)
no temperature effects on the detection of the propagation time
non-critical in regard to changes in the preamplifier parameters
no influence of the properties of the object on the distance measurement.

Further advantages will appear from the following description and the further claims.

BRIEF DESCRIPTION OF THE FIGURES

The invention is described in more detail hereinafter with the aid of the exemplary embodiments illustrated in the Figures. Therein.

DETAILED DESCRIPTION OF THE INVENTION

Figure 1A:
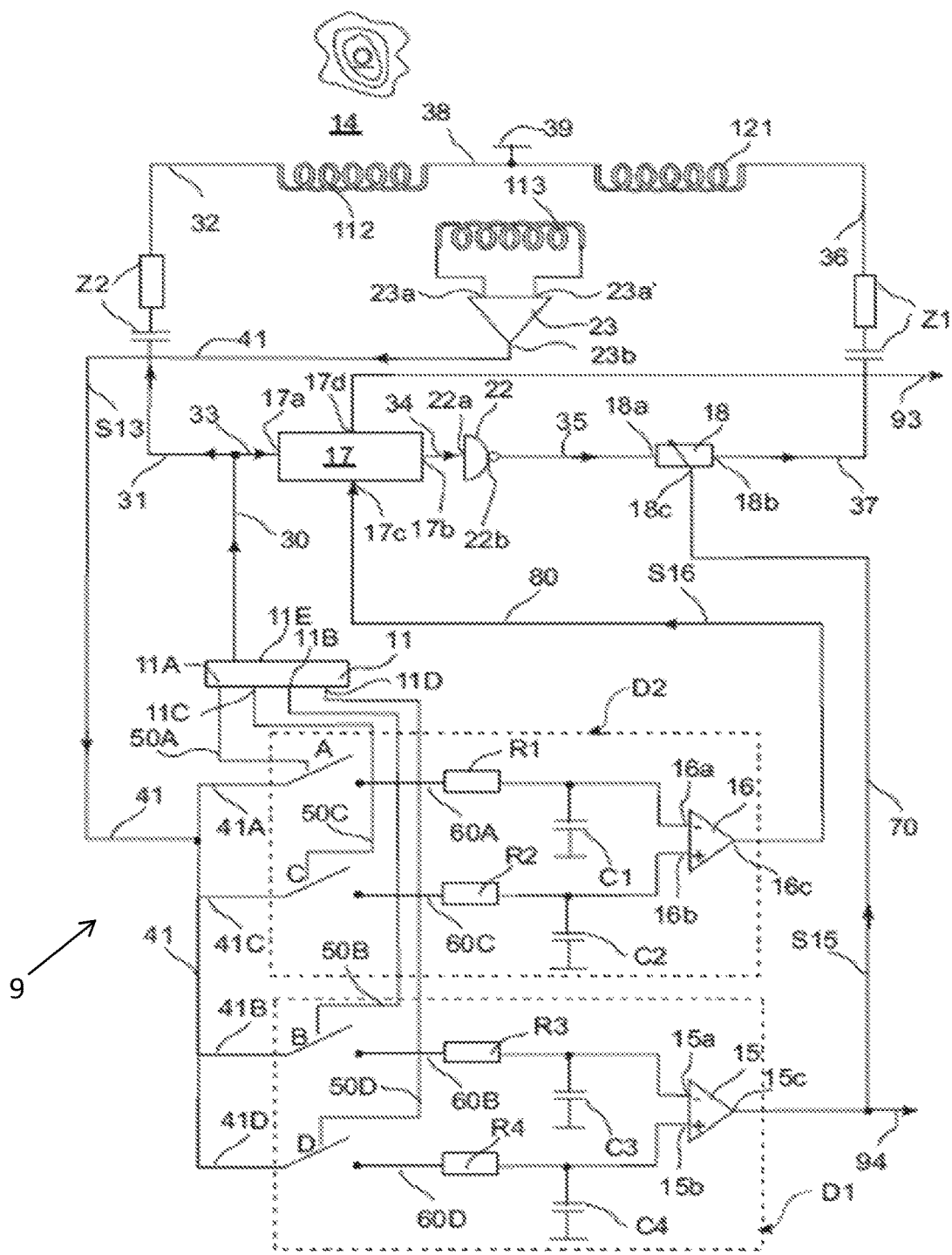
FIG. 1A shows a schematic circuit diagram of a circuit in accordance with the invention for the measurement of the influence of or the propagation time of field changes in an inductive field.

The invention is now described in more detail in exemplary manner with reference to the accompanying drawings.

Nevertheless, the exemplary embodiments are merely examples which are not intended to restrict the inventive concept to a certain arrangement.

Before the invention is described in detail, it should be pointed out that it is not restricted to the particular components of the circuit or the particular method steps since these components and methods can vary. The terms used here are merely intended to describe special embodiments and are not used in a restrictive manner. If, in addition, the singular or indefinite article is used in the description and in the claims, this also refers to a plurality of these elements as long as the general context is not unambiguously making something else clear.

The invention enables a distance measurement to be made which permits an accurate propagation time measurement of field changes in inductive fields which measurement is free of ambient influences, independently of the material properties of the object and is using amplifiers having a narrow bandwidth. Moreover, it is possible to make a propagation time measurement in a range close to the surface of the coil up to larger distances without having to switch-over the measuring range.

The invention proceeds from the following consideration:

A distance measurement can be effected as a result of inductive field changes in inductive fields, if it is possible to detect the changes of inductance which occur in consequence of an approach, presence and/or distancing of an object that affects the field.

At the same time, signal 94 delivers information about the mass of the object O. Of course the further field change can also be provided electronically as a voltage signal without using a compensation element.

During operation, if there is no object O in reach, both coils 112, 121 are sending the same, but inverted signal, so that there is no difference existing, when the signal and the inverted signal are summed up. If there is an object O as in FIG. 1A near coil 112, then coil 121 is still sending the unmodified signal, while coil 112 submits a modified signal, both of which are received by the receiving coil 113. This leads to a signal difference which is then evaluated to get the clock pulse alternation signal according to FIG. 5, for example. Although the object O is illustrated as existing next to coil 112 (i.e., closer to coil 112 than coil 121), an object may exist next to coil 121 (i.e., closer to coil 121 than coil 112) as shown in FIG. 1B. Accordingly, coil 121 would be the directly regulated coil while coil 112 would be the indirectly regulated such the signal difference would still occur as discussed herein without departing from the scope of the invention.

The measurement is described in the following for the case of an inductive solution: A clock generator, i.e., clock pulse control system 11, gives a current via output 11E and lines 31, 32 with intermediate impedance Z2 to the sending coil 112. Thus, the sending coil 112 receives in a clocked manner an inductivity influencing their effect in the surrounding field. A current is passed to the further coil 121 that is used as a compensating coil according to the clock rate via phase shifter 17 and amplitude controller 18 via its output 18*b* and the lines 37 and 36 with intermediate Impedance Z1. The coils 112, 121 are connected to earth 39 via line 38. The clocked current signal is received by the receiving coil 113, is detected, and is passed to the inputs 23*a*, 23*a*' of amplifier 23. The clocked inductivity applied is influenced by the approach, presence or distancing of an object O.

This influence does not take place immediately, but with the delay of the light propagation time. The field changes can be received and be combined in the amplifier 23 when collected from the coils 112, 121. As discussed above, an initial clocked current is delivered to one of the coils, i.e., a first coil, which in turn generates a electromagnetic field. The generation of the electromagnetic field through a first coil will induce a current in the other coil. The currents flow through the coils in a clocked manner. That is, the current flowing through the first coil is delivered as a clocked signal that oscillates between a high state (positive voltage) and a low state (0 voltage or negative voltage). In turn, the signal induced in the second coil also flows therethrough in a clocked manner. The signal on either the first coil or the second coil is transferred to the receiving coil 113, based on the state of the signal. For example, the current flowing through the first and second coils (e.g., 112, 121) generates an electromagnetic field, which in turn is capable of inducing another current in the receiving coil. The resulting current induced to flow through the receiving coil is referred to as the received signal. Since the current flowing through both the first and second coils 112, 121 are clocked, the receiving signal delivered to the receiving coil is also clocked.

In at least one embodiment, the clocked signals (i.e., the signals flowing through either the first coil 112 and the second coil 121) are transferred to the receiving coil 113 while the signal exists in its high-clocked state (i.e., positive voltage state). For instance, during a first time period, the current flowing through the first coil is in a high-state while the current flowing through the second coil is in a low-state. Thus, the high-portion of the signal flowing through the first coil is transferred to the receiving coil 113, while the signal flowing through the second coil is not transferred. During a second subsequent time period, the current flowing through the first coil is in a low-state while the current flowing the second coil is in a high-state. Accordingly, the high-portion of the signal flowing through the second coil is transferred to the receiving coil 113, while the signal flowing through the first coil is not transferred. During a third subsequent time period, the current flowing through the first coil is again in a high-state while the current flowing the second coil is in a low-state. As a result, the high-portion of the signal flowing through the first coil is transferred to the receiving coil 113. During a fourth subsequent time period, the current flowing through the first coil is in a low-state while the current flowing the second coil is in a high-state. Thus, the high-portion of the signal flowing through the second coil is transferred to the receiving coil 113. The summation (i.e., combination) of the received signals transferred to the receiving coil 113 therefore generates a single received signal comprising the various portions of the signals flowing through the first and second coils 112, 121.

Therefore, at least one embodiment allows for one common received signal at amplifier 23 that originates from both coils 112, 121. This signal can be divided into the sections A and B originating from the first coil 112 and into sections C and D originating from the further coil 121, since the clock rate is known. If an object exists in the field, or is approaching, an inductive field change occurs at least with respect of coil 112, for example. That is, at least one sending coil can produce one or more first inductive temporal field changes in a sensor-active region, which are then transmitted in clocked manner (i.e., according to a the clock rate) to at least one receiving coil transmitting a plurality of first inductive temporal field changes. In at least one example, each of these first temporal field changes is comprised of timely consecutive switch-on time sections A and B. By evaluating or analyzing the change at a coil 112,121, the one or more inductive field changes (e.g., the first inductive field changes or further inductive field changes) can effectively be transmitted. Therefore, there is a time gap between receiving this signal from further coil 121 and from the coil 112 correlated to the object. This time gap is then detected as clock pulse alternating signal within the inductive field change as explained in connection with FIGS. 4 to 7. Therefore the clock pulse alternating signal may be viewed as only a part of the inductive field change.

Now if the object O is in the sensor-active region 14, i.e. if the object reaches the detection path between the sending coil 112 and the object at a distance of e.g. approximately 15 cm, the field changes that are detected dynamically by the device are received by the receiving coil in the form of an element that is in effective connection with the sending coil 112. From a theoretical viewpoint, the field change information returned by the object appears delayed in time relative to the transmitted information by the light propagation time, i.e. approximately 1 ns at 15 cm. The time difference is firstly separated from the actual pulse information. To this end, the transmission pulse for the compensating coil 121 is activated in the pulse break, said electrode directly picking up its field change without the alternative routing via the object O. The compensating coil 121 could of course also interact with the object, but the essential thing is only that at least one of the detection paths is adapted to be influenced by the object.

Figure 4:
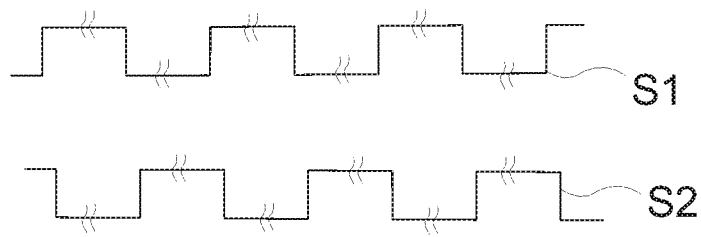

If both signal powers S1, S2 in accord with FIG. 4 arrive over the line 41 with equal amplitudes (which naturally can be maintained with the same magnitude by means of an amplitude control process on the coils 112, 121), an essentially dc voltage signal, consisting of the voltage signals of the two coils alternately and a possible offset, appears at the inputs 23a, 23a' of the amplifier 23. If both coils 112, 121 have the same induction—eventually after controlling the amplitude by means of the amplitude controller 18, there is a signal corresponding to a zero state at the output 23b of amplifier 23. This regulated state is also obtained, when moving the coils 112, 121 within an external magnetic field in the sensor-active region 14. If now there is a metal object O e.g. buried in the soil within the sensor-active region 14, this object changes the induction of coil 112, while coil 121 as reference coil is not influenced in the embodiment.

Upon closer inspection, a propagation time difference of 1 ns is impressed on the dc voltage signal at the amplifier 23 at the transition of the transmission pulses of the two coils. In one phase, there is a gap in the dc voltage signal of the alternating signal waveforms at that point where the compensating coil 121 has already switched off, but the change pulse of the electrical field on the coil 112 still has to traverse the distance of 15 cm to the object and back. In the second phase, the compensating coil 121 is already transferring a signal, whilst a pulse from the coil 112 that was in fact switched off at the correct time point is still on its way. This is illustrated schematically in FIG. 5. In the received signal, this results in a very short peak of in the exemplary embodiment phase synchronous, alternating polarity. This time difference is extremely small for the receiving coil 113 so that it only appears as an extremely small change in the value of the current in the case of a low-pass characteristic of e.g. 200 kHz.

Figure 5:
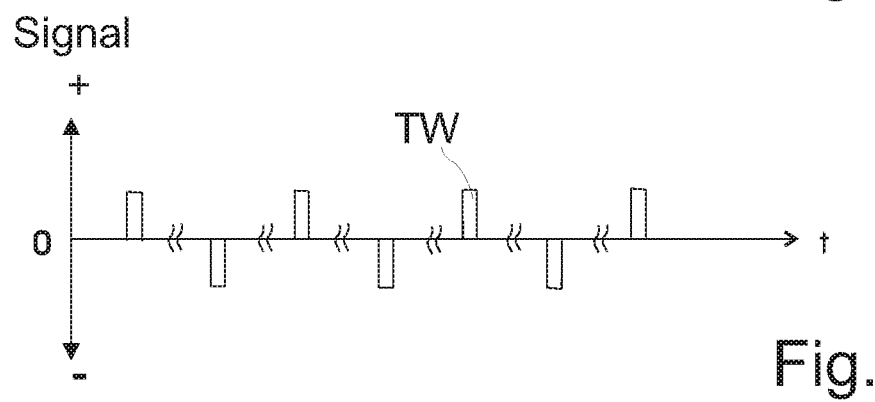
Figure 6:

Thereupon, the law of conservation of energy is utilized: If we assume that only the coil 112 directed outwardly towards the object O was receiving or collecting an inductivity at the clock rate, and the compensating coil 121 was out, then an alternating signal, which illustrated in the form of a voltage e.g. an alternating voltage of 10 mV at output 23b of the arbitrary alternating voltage amplifier, arrives at the amplifier 23. If we could proceed from the concept of an ideal receiving coil and an ideal amplifier having an ideal rise time characteristic, we would continue to assume a 10 mV output signal having a 50% duty cycle in the case of a sending coil. If one adds the second coil thereto, pulses of 1 ns that alternate clock-synchronously in the positive and negative direction will occur because of the propagation time of a signal (FIG. 5). Then, in the case described, these pulses are the only information in the amplified signal and represent the propagation time information. In practice however, the "low-pass behavior" of the receiving coil 113 and the amplifier 23 will "swallow up" this extremely short pulse.

Figure 7:
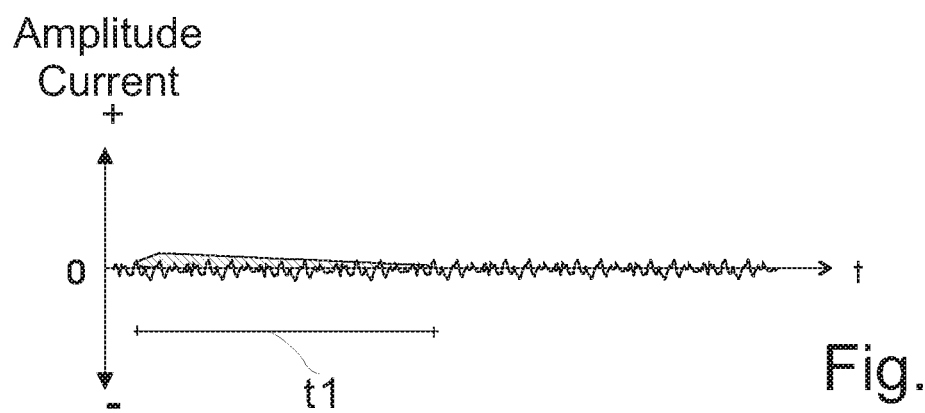

Here, the advantage of the amplitude-type regulated system in accordance with the invention comes into play: Since only the short pulses in the form of change information are present at the amplifier 23 which consists e.g. of a three stage amplifier having a 200 kHz bandwidth, the received signal can be amplified virtually at will e.g. by an amplification factor of ten thousand. The theoretical change in the pulse of 1 ns length and in the ideal case of 10 mV at the first amplifier output does in fact, in practice, only produce a heavily rounded voltage swing of e.g. 10 µV (schematically FIG. 6) which however, now results in a signal of 100 mV with a length t1 of e.g. 5 µs after a ten thousandfold amplification process in the further amplifier stages (FIG. 7). Hereby, no particular demands are imposed on the amplifier 23, a 200 kHz bandwidth suffices e.g. for a corresponding amplification. Even though arbitrary amplifiers are employable, alternating voltage amplifiers are preferably used. After switching from one coil to the other, the signal appears after the switch-over time point in alternating directions (positive negative). The received signal can be examined at this time point for synchronous signal components by a rectifier that is switched in synchronism with the clock rate. Signal components occurring due to propagation time differences can still be detected perfectly in a very noisy signal by simple integration of the synchronous demodulated signal components. It should be mentioned that the synchronous rectifier or synchronous demodulator D1, D2 is not a circuit which has to precisely detect the phase, but one which detects the amplitude in clocked manner. The phase accuracy does not have any influence on the accuracy of the measurement so that a phase shift of e.g. 20° is still irrelevant.

Since the occurrence of these clock synchronous signal components indicates a propagation time difference between the two coils 112, 121 and in addition, also permits a clear allocation to the coils, a control loop in accord with FIG. 1A (see below) can be closed using this information in such a manner that the signal from the compensating coil 121 is shifted by the same amount as the charge that is being influenced by an object using known means (controllable propagation time e.g. by means of an adjustable all-pass network or a digitally adjustable phase shift). The necessary displacement of the electrical control pulse at the phase shifter 17 (FIG. 1A or FIG. 1B) for the coil 121 is then a direct measure for the influence of or the propagation time of field changes in the capacitive field and thus is also a direct measure for the effect or the distance of the object O.

After the synchronous demodulation of the propagation time dependent signal components, the two signal components can self-evidently be compared with one another for mutual regulation to "0" by means of a phase shift of the coil 121 e.g. in further high amplification factor operational amplifiers—without any particular demand on the bandwidth. If a very small difference between the two clock synchronous signal components is then still present, this is compensated to "0" by the phase control process.

Figure 1B:
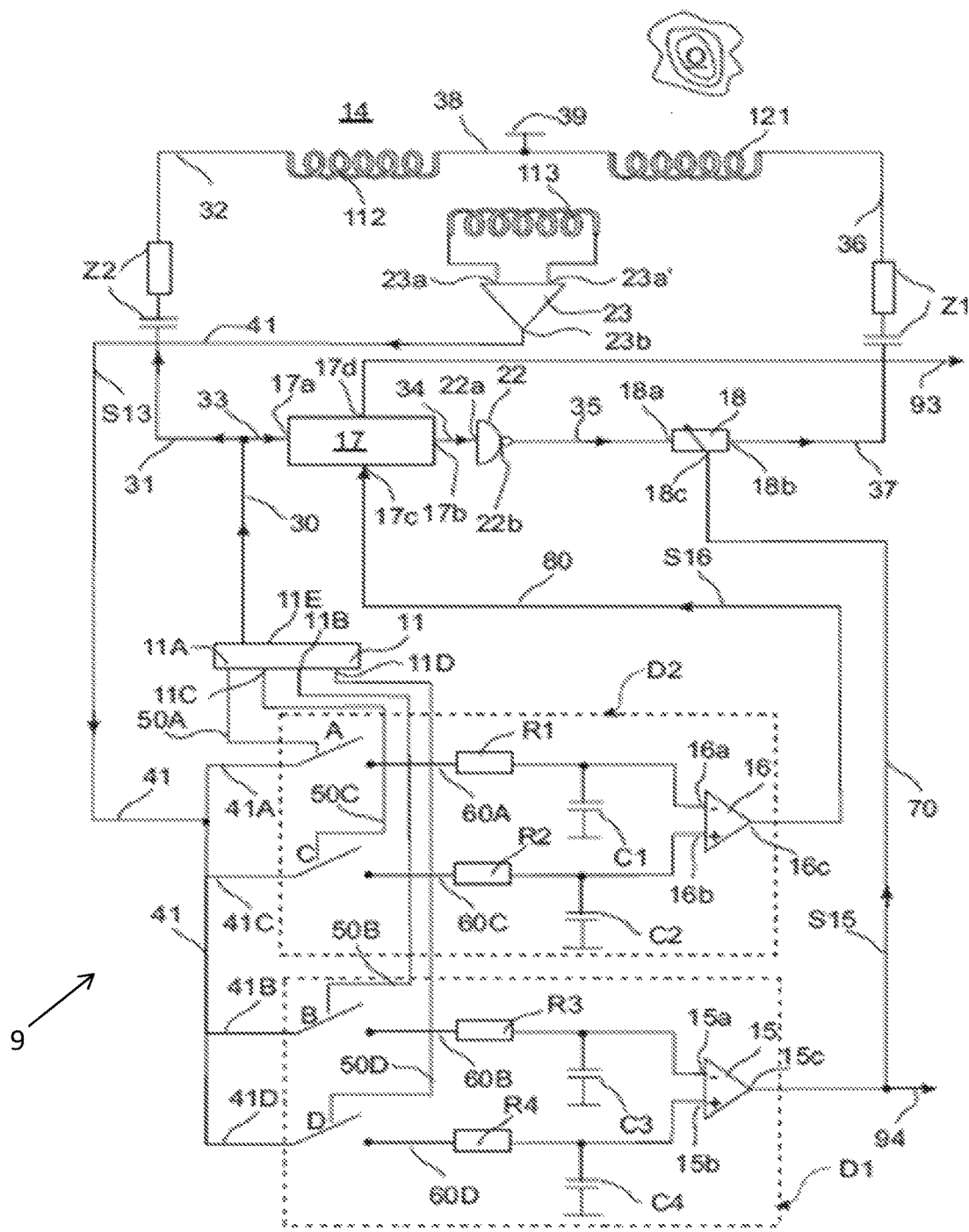
FIG. 1B shows another schematic circuit diagram of a circuit in accordance with the invention for the measurement of the influence of or the propagation time of field changes in an inductive field, FIG. 2 the received signal present at the receiving coil of FIG. 1A or FIG. 1B with the appertaining sub-division into different ranges, FIG. 3 the signal in accord with the upper part of FIG. 2 after the amplitude and phase control process, FIG. 4 the signal waveform at the receiver from the measuring path with and without a detection path illustrated in an idealized manner, FIG. 5 the resulting field propagation time pulse at the receiving coil illustrated in an idealized manner, FIG. 6 a pulse from FIG. 5 depicted in exemplary manner, FIG. 7 the pulse from FIG. 6 after passing through the receiving coil and the amplifier.

In the exemplary embodiment, two different control loops shown at the bottom of FIG. 1A or FIG. 1B are used at the same time. On the one hand, the received amplitude from both detection paths is regulated to the same value at the inputs of the amplifier 23 by an amplitude control process on at least one of the two coils as is known from EP 706 648 B1. Since, following the switch-over from the at least one coil to the at least one further coil, the phase difference in the form of amplitude information is heavily extended in length, the signal should first be examined for clock synchronous amplitude differences at a time point when the propagation time information has already faded away. In practice, a clock frequency of e.g. approximately 100 kHz-200 kHz has proved to be well suited, whereby, in a first part of a clock period, the signal is examined for propagation time differences, which do then appear as an amplitude in the signal, before the phase control process and, in the second part of a clock period, it is examined for purely amplitude differences. With the information from the second half of a clock period, at least one of the two coils in the exemplary embodiment is then only affected in amplitude by the amplitude control process 18 in order to obtain signals of approximately equal magnitude from both paths and thereby regulate the difference value to zero. Equally large signals from both paths lead to a zero signal without clock synchronous alternating components.

Self-evidently, the phase of the directly effective coil 121 does not necessarily have to be adapted in correspondence with the coil 112 that is subjected to the propagation time effect. The coil that is subjected to the propagation time effect can also be affected with appropriate circuitry.

The advantages mentioned hereinabove are achieved by each of these two closed control loops due to the
  amplitude control
  propagation time control
to a "0—clock synchronized" component.

The method serves for the measurement of the propagation time of field changes in inductive fields (FIG. 1A or FIG. 1B). Firstly, an inductivity that is modulated by a clock generator 11, i.e., a clock pulse control system 11, at e.g. 200 kHz is introduced from the output 11E, over the line 30, 31 and via the coil 112 into a detection path in a sensor-active region 14. The coil affects the surrounding electrical field between the coil 112 and the object O. This influence takes place at the speed of light.

At the same clock rate but inverted by the inverter 22, an inductivity is also produced at a further coil 121 serving as a compensating coil, also affecting the received signal at the amplifier 23 in a clocked manner. To this end, the current is passed to the input 17a of the phase shifter 17 over the line 30, 33 at the clock pulse rate of the clock pulse control system 11 (i.e., clock generator) and it is then passed from the output 17b of the phase shifter and the line 34 to the input 22a of the inverter 22, and from the output 22b thereof, the charge arrives over the line 35 at the input 18a of the amplitude control 18. The charge then passes from the amplitude control 18 via the output 18b and lines 36, 37 to the coil 121.

In at least one embodiment, the clock generator 11 delivers a signal to coil 112 and to inverter 22. In at least one embodiment, a single signal is generated, which is output to both coil 112 and the inverter 22. For example, the signal (non-inverted) may be directly output to the coil 112, but tapped upstream from the coil 112 and delivered to the inverter 22 where it is inverted and then output therefrom to generate an inverted signal. Thus, the signal generated by the clock generator can be used to generate a negative pulse portion. In another embodiment, a first signal output from the clock generator 11 is delivered to coil 112 while a second signal output by the clock generator 11 is delivered to the inverter 22. In either case, one signal (e.g., the non-inverted signal) will be positive, while the other signal (e.g., the inverted signal) will be negative, so that each signal (i.e., the non-inverted and inverted signals) may cancel each other out. It should be appreciated that the inverter 22 may invert a signal from the positive to the negative and vice versa as understood by one of ordinary skill in the art.

In at least one embodiment, coils 112, 121, respectively, are getting at the same time a signal respectively the same but inverted signal, which signal and inverted signal are clockwise changing from a positive to a negative signal. This means that one cycle contains a positive signal and an inverted negative signal. Both of these signals are received and summed up by the receiving coil 113, so that only one signal exists as received signal. This means that the clocked signal sent to the coils is received as one common signal at the receiving coil 113. Accordingly, the same received signal is subsequently divided into the sections A to D.

The transmission pulse for the compensating coil— whichever of the coils 112 and 121 it may be—may be activated in the pulse brake. In this manner, both pulses can be combined into one signal at the receiving coil 113, but afterwards can be separated again via synchronous demodulators D1 and D2 as discussed in greater detail below.

Thus, the signal S13 from the two coils is present at the inputs 23a, 23a' of the amplifier 23 in alternating manner corresponding to the clock rate of the clock pulse control system 11 in the form of a respective first change value or a further change value in consequence of the respective first and further field change. The signal S13 reaches is amplified in the amplifier and then supplied over the line 41 to two similarly constructed synchronous demodulators D1, D2 comprising respective comparators 15 and 16 such as are illustrated at the bottom of FIG. 1A or FIG. 1B. Hereby, the task of the synchronous demodulators D1, D2 is not to detect the phase exactly, but rather, the amplitude in a clocked manner. The phase accuracy does not have any influence on the accuracy of the measurement so that a phase shift of e.g. 20° is still irrelevant.

Before going into these circuits in greater detail, the upper part of FIG. 2 shows the signal as it is after the amplifier 23. The illustrated signal shows a signal waveform such as is present for a propagation time over an e.g. 15 cm distance to the object from the coils 112 and 121 without an adjustment for the phase of the signal in at least one of the two field paths. The occurrence of the clock synchronous signal components can be detected with the aid of an appropriate gate circuit 9 and assigned to the corresponding electrodes. Hereby, one should distinguish between amplitude differences occurring over the entire clock range and signal amplitudes occurring immediately after a switch-over of the clock rate. In at least one embodiment, the gate circuit 9 comprises the clock pulse control system including a clock generator 11 configured to switch the gate of the parts of the synchronous demodulator via the outputs 11A, 11B, 11C and 11D. In at least one embodiment, the gate circuit 9 includes the clock generator 11 (which includes a hardware controller) and selector lines 11A-11D. The clock generator generates a clock signal which is used for actively switching the switches 41A to D via the output 11A to D, and can sequentially switch on and switch off each line 11A-11D one after the other during each clock cycle. For example, during a first clock cycle, line 11A is switched on, while lines 11B-11D are switched off. During the next clock cycle (i.e., a second clock cycle), line 11B is switch on, while lines 11A, 11C and 11D are switched off. During the following clock cycle (i.e., a third clock cycle), line 11C is switched on, while lines 11A, 11B and 11D are switched off. During the next clock cycle (i.e., a fourth clock cycle), line 11D is switched on, while lines 11A-11C are switched off. If there is a clock frequency of e.g. approximately 100 kHz-200 kHz, the clock pulse control system 11 controls for example four sections per clock, which can be equidistant in time as can be seen in FIG. 2. They are switched active once per clock, so that the switches 41A, 41B, 41C, and 41D can be switched on and off via clocking lines 50A to 50D, when the respective section is activated. For example, the gate circuit 9 may comprise the clock generator 11 and is configured to control, via outputs 11A to 11D and clocking lines 50A to 50D, the switches 41A to 41D that divide the received signal into sections A to D. The switches are engaged clockwise, wherein one cycle consists of sections A to D, wherein section A and B originate from coil 112, while sections C and D originate from coil 121. Accordingly, the particular part/section of the signal that is on line 41 at a respective point in time can be detected and referred to the corresponding section, based on the current clocked switch so that the received signal (i.e., the signal received at coil 112) is divided accordingly, i.e., divided into sections A-D.

To this end, a clock cycle is sub-divided into four sections A/B/C/D in FIG. 2. Each section may include one or more amplitude values. For example, sections B, D represent amplitude values which are equal in the regulated state without clock synchronous amplitude differences, thus, i.e. from clock pulse to clock pulse. The regulated state of the sections B, D relates to the amplitude control process for at least one of the two coils. In the regulated state of the amplitudes to equal values in the clocked sections B and D, there is a signal without clock synchronous signal components in the case of an equal propagation time from both coils. It is only in the event of a propagation time difference between the signal from the further coil 121 and the signal from the detection path that a clock synchronous signal component appears which, however, falls into the sections A and C. For example, a first clock pulse alternation signal portion received at the receiving coil may be detected during the time section A between the first pulses and the further pulses, and a further clock pulse alternation signal portion received at the receiving coil may be detected during the time section C between the further pulses and the first pulses.

In other words, sections B and D, and also sections A and C, are parts of two pulses constituting a clock cycle signal. The received signal is divided into a first part of the pulse signal constituting sections A and C and a second part of the signal constituting sections B and D. The two sections may therefore each be regulated as described herein. The receiving signals received by receiving coil 113 are input to synchronous demodulator D1 via line 43. Switches 41B, 41D are switched on and off at a clock pulse alternation rate. Accordingly, section B of the clock cycle is delivered through the upper part of synchronous demodulator D1 and section D is delivered through the lower part, wherein switches 41B and 41D are alternately switched. It is therefore possible to separate the receiving signal received from coil 112 from that of coil 121. The separated signals can be compared at comparator 15, so that a control signal 70 can be produced which regulates the amplitude via amplitude regulator 18. This leads to the effect that the amplitude of section B and D are substantially equal in an amplitude regulated state.

In at least one embodiment, the receiving coil may have three functions. Indeed the receiving coil will receive the in and out of phase signals from the two coils 112 and 121 and delivers one common received signal which is later on divided into the sections A to D in the synchronous demodulator D1, D2. Thus, the receiving coil may receive the first and further temporal field changes. At the same time, field changes occur at the receiving coil due to existence of an object or during the approach of an object. In at least one embodiment, the field changes occurring at the receiving coil are demodulated, and the demodulated result is evaluated or analyzed. The evaluation may include, for example, comparing the demodulated result using comparator 15 so that a control signal 70 can be produced which regulates the amplitude via amplitude regulator 18.

Referring again to FIG. 1A, the synchronous demodulators D1 and D2 incorporating the comparators are controlled by the clock pulse control system 11 via the outputs 11A, 11B, 11C and 11D and the appertaining clocking lines 50A, 50B, 50C and 50D in such a way that the synchronous demodulator D1 regulates the clock synchronous amplitude difference of the change values in the received signal S13 by means of the amplitude control 18 for the purposes of regulating the clock synchronous components at the amplifier 23 to "0", whereas the synchronous demodulator D2 detects the propagation time difference between the signals and regulates the clock synchronous component at the amplifier 23 to "0" by means of the phase shifter 17. In the case of a non-regulated propagation time, there is a clock synchronous signal component in the clock sections A and C which changes polarity from phase to phase and leads to a control signal S16 at the output of the synchronous demodulator D2 and this said signal in turn controls the phase shifter 17 in such a way that a "0" signal without clock synchronous signal components is present at the output 23b of the amplifier 23.

According to at least one embodiment, the gate circuit 9 divides the received signal into sections corresponding to the time sections A, B, C, D at the clock rate of the clock pulse control. The controller included in the gate circuit 9 generates the clock signal which can be used to actively switch the switches 41A to 41D via the output 11A to 11D and the clocking lines 50A to 50D. The gate circuit 9 may include a clock controller/clock generator 11, along with output lines 11A to 11D, switches 41A to 41D, and clocking lines 50A to 50D.

The division of the signals according to the clock rate of the clock pulse control of the gate circuit 9 provides a means for comparing in a clocked manner the divided sections of the received signal. For example, the received signal of the first temporal field changes corresponding to the time section B can be compared in a clocked manner with the further temporal field changes corresponding to the time section D for generating a comparison value at an output of a first comparator 15 which is used for regulation of amplitude values of at least one of the first inductive temporal field changes or the further inductive temporal field changes in such a way that sections of the received signals corresponding to the sections B or D are substantially of equal amplitude at least at inputs 15a, 15b of the first comparator 15.

In at least one embodiment, a first clock pulse alternation signal portion is received at the receiving coil during a time section (e.g., time section A), and a further clock pulse alternation signal portion during another time section (e.g., time section C). The time section (e.g., time section C) of the further clock pulse alteration signal may be detected when the magnitude of the sections of the received signal, corresponding to the time sections B and D, have been regulated such as to be of substantially equal amplitude at the inputs of the first comparator. For example, in the synchronous demodulator D1, the received signal S13 received on line 41, i.e. the change values are broken down again into the two partial signals of the coil 112 and the further inductivity 121. To this end, the signal reaches the switches associated with the sections B and D over line 41, 41B, 41D, said switches being actuated over the clocking line 50B and 50D by the clock pulse control system 11 at the clock pulse alternation rate of the sections B and D. Thus, in correspondence with the switching position at the output of the switches, the signal for the change values corresponding to the sections B and D originating from the detection process at the receiver that has possibly been affected by the object is present on line 60B and 60D. These signals are supplied via an integrator R3, R4 and/or C3, C4 to the inputs 15a, 15b of the comparator 15, at the output 15c of which there is a corresponding control signal in the event of signals of equal magnitude for a zero state of the signal S13. If another signal is present there, then an arbitrary control signal in the form of signal S15 appears over the line 70 at the input 18c of the amplitude control 18 which readjusts the amplitude of the further coil 121 in such a way that the signal S13 becomes a signal corresponding to the zero state, i.e. one that contains no clock synchronous components and thus no further adjustment is necessary. In this state, the clock synchronous alternating components are eliminated and thus the control value 94 contains the information in regard to the object properties, whilst the control value 93 contains the information in regard to the distance of the object O. In the drawing, it is the amplitude of the further coil 121 that is readjusted, however it is self-evident that this regulation process could equally be effected on the coil 112 or on both or on several in the case of several sending elements as is also known from EP 706 648 B1. Although it is illustrated that the amplitude of the further coil 121 is adjusted, at least one embodiment is capable of adjusting the amplitude of coil 112.

In other words, the synchronous demodulator D1 is used for a clocked-section type amplitude detection process, a signal without clock synchronous components from both paths preferably being present already on the input thereof i.e. on the switches assigned to the sections B and D. The clock pulse alternation signal TW can then be detected in the noise at the output of the amplitude detector in the form of the synchronous demodulator D2 from the remaining zero signal. That is, amplitude values of the first clock pulse alternation signal portion between the first inductive temporal field changes and the further inductive temporal field changes can be detected in any order (i.e., detections in increases in amplitude or decreases in amplitude) despite noise when amplitudes of the first inductive temporal field changes and the further inductive temporal field changes have been regulated.

A phase change of the sampling periods over the clocking lines 50A, 50B, 50C, 50D has no effect upon the distance measurements over wide ranges. In contrast to the high precision that is needed for the phase of the synchronous demodulator in DE 100 22 054 A1, this does not enter into the distance measurement process in accordance with the invention. It is only necessary to sample the amplitude at an approximate time point of the clock rate. In consequence, the synchronous demodulation process in accordance with the invention is only a quasi synchronous demodulation process. The phase itself is of little importance for enabling differences in the amplitude of the clock pulse alternation signals to be detectable and for reducing the clock synchronous component at the input of the amplitude detector in the form of the synchronous demodulator D2 to zero. These clock pulse alternation signals are then mutually minimized and preferably reduced to zero by means of the phase shift of the signals present in the device between the coils 112 and 121. The delay of the phase shifter 17 resulting thereby is the propagation time of the field change and thus the distance of the object O that is to be determined.

In the center of FIG. 1, the two upper switches of the synchronous demodulator D2 are controlled by the gate circuit 9 in correspondence with the ranges A and C in accord with the upper part of FIG. 2. In the synchronous demodulator D2, the received signal S13 and thus the change values are likewise associated with the amplitude signals of the two coils 112 as well as 121, but here, the signal sections corresponding to the sections A and C. To this end, the signal arrives over the line 41, 41A, 41C at the switches which are associated with the sections A and C and which are actuated over the clocking line 50A and 50C by the clock pulse control system 11 at the clock pulse alternation rate of the sections A and C. Thus, in correspondence with the switching setting, the signal on the line 60A and 60C corresponding to the sections A and C is present at the output of the switches. These signals are supplied to the inputs 16a, 16b of the comparator 16 via the integrators R3, R4 and/or C3, C4. Accordingly, at least one embodiment provides a feature where the first and further field changes are sent out by the same components (112, 121) and are received by the same components (e.g., coil 113), are thereafter subdivided and delivered over lines (41A-41D) and synchronously demodulated. Then the difference value at the comparators is the control value to control the stabilized state to zero.

In consequence, the first field change and any further field change corresponding to the propagation time in the detection path within the sensor-active region 14 and occurring at the clock pulse alternation rate are detected in clocked manner. The magnitudes of the signals insofar as their amplitudes are concerned are of course dependent on the object O, but as we are concerned here with the determination of the clock synchronous difference in values between these two signals, this plays no part. The two signals are compared in the further comparator 16. The difference value at the output 16c of the comparator corresponds to the phase difference between the first and a further field change and is converted into an amplitude value due to the integration process in the receiver. That is, the comparator (e.g., a further comparator 16 used for regulation of phase) is capable of determining a difference value based on a comparison of the first clock pulse alternation signal portion with the further clock pulse alternation signal portion in accordance with their amplitude. This value can be sampled at any arbitrary time point at which phase information is no longer present.

This difference value for the not phase exact amplitude values, i.e. amplitude values not agreeing precisely with the phase boundaries, arrives at the input 17c of the phase shifter 17 over the line 80 in the form of the signal S16 and is so changed in the phase shifter 17 until such time as it reaches its minimum and preferably zero in order to thereby determine the propagation time of field changes in the inductive fields. From the delay of the phase shifter 17 that has been set thereby, the propagation time can be determined and thus the distance which is present at the output 17*d* of the phase shifter 17 in the form of a signal for the propagation time 93. Due to the change of the phase shifter 17, the amplitudes of the clock pulse alternation signal TW disappear in the noise in accordance with FIG. 3.

The phase shifter 17 can be an analogue working circuit, but could also be a digital signal delay arrangement. Hereby for example, a high frequency clock rate can be counted out in such a way that the clock rate can be displaced into e.g. 1 ns steps. To this end, the signal S16 is sampled by an A/D transducer and the result is converted into a corresponding phase shift.

The sensor-active region 14 with the coils is coupled in high impedance manner via the impedances Z1 and Z2 and thus to the drivers and the amplifier 23 in such a way that even the smallest changes in the environment becomes apparent in the form of an amplitude and/or a phase change. In the exemplary embodiment, the coupling is preferably effected via condensers and resistances, although coils or combinations of the aforementioned components or individual ones of the components could also be provided for this purpose. As illustrated in FIG. 1A, for example, since phase control 17 and amplitude control 18 are all electrically connected via impedance Z1 and Z2 and thus with coil 112 and further coil 121, even if only one amplitude is controlled because of the influence on one signal via amplitude control and phase control, if the amplitude of section B is controlled, this controls the amplitude of section D also and vice versa. Therefore, divided sections (e.g., sections B and D) may be controlled.

As a result of the high induction, the desired high impedance from the coil 112, to the output stage and to the amplifier 23 is achieved. In consequence, even the smallest changes can be detected when the object O is connected via any arbitrary electrical connection to the circuit in accordance with the invention. Even a metallic conductive connection to the reference potential of the circuit in the direct proximity of the measuring device does not disturb the sensitivity of the system. Due to the preamplification or the high regulating capacity of the synchronous demodulators D1, D2 incorporating the comparators, even the smallest changes in the field can be detected perfectly.

Apparent here too, is the effect that this change in the field propagates at the speed of light so that, as previously described, the distance of the object O can be determined in the form of a signal 93 from a phase control process for the clock pulse alternation signals. At the same time, the signal 94 supplies information about the eddy current characteristics or the mass of the object O. Self-evidently, the further field change can also be present in an electronic way in the form of a voltage signal without the use of a compensating element.

An advantage of the invention is also the arbitrary choice of the clock frequency which can adopt arbitrary values from one clock cycle to the next. Thus, for the purposes of suppressing interference in the case of parallel and non-synchronizable systems being used, an arbitrary "frequency-hopping" (FDMA) arrangement can be used in problem-free manner. In consequence, this system is suitable for realizing not just one individual propagation time measuring path with simple means, but also a plurality of parallel detection paths.

The elements of the appertaining device are already apparent from the previous explanation, in particular, with reference to FIGS. 1 and 8.

As used herein, the term "module" or "controller" refers to an application specific integrated circuit (ASIC), an electronic circuit, an electronic computer processor (shared, dedicated, or group) and memory that executes one or more software or firmware programs, an electronic hardware controller, a microcontroller, a microprocessor in signal communication with memory, a combinational logic circuit, and/or other suitable components that provide the described functionality. When implemented in software, a module can be embodied in memory as a non-transitory machine-readable storage medium readable by a processing circuit and storing instructions for execution by the processing circuit for performing a method.

While the embodiments have been described, it will be understood by those skilled in the art that various changes may be made and equivalents may be substituted for elements thereof without departing from the scope of the embodiments. In addition, many modifications may be made to adapt a particular situation or material to the teachings of the embodiments without departing from the essential scope thereof. Therefore, it is intended that the disclosure not be limited to the particular embodiments disclosed, but that the disclosure will include all embodiments falling within the scope of the application.

It is self-evident that this description can be subjected to the most diverse of modifications, changes and adaptations which fall within the range of equivalents to the Claims attached hereto.

What is claimed is:

1. A method for measuring influence of a propagation time of inductive fields comprising the steps:

transmitting, via a clock pulse control system, an alternating signal to a first coil in a sensor-active region, the first coil generating first inductive temporal field changes at a clock rate, the first inductive temporal field changes including consecutive time sections A and B, inverting the alternating signal via an inverter, and transmitting, via the inverter, the inverted signal to a further coil, the further coil generating further inductive temporal field changes at the clock rate, the further inductive temporal field changes including consecutive time sections C and D, wherein the further inductive temporal field changes are displaceable in time relative to the first inductive temporal field changes via a phase shifter, detecting, via a receiving coil, the first and further inductive temporal field changes, and outputting a received signal from the receiving coil based on the first and second inductive temporal field changes dividing the received signal into sections corresponding to the time sections A, B, C, D via switches that are switched at the clock rate generated by the clock pulse control system, comparing, via a first comparator, a portion of the received signal corresponding to the time section B, with a portion of the received signal corresponding to the time section D to generate a first comparison value and transmitting the first comparison value to an amplitude controller, regulating, via the amplitude controller, amplitude values of at least one of the first inductive temporal field changes or the further inductive temporal field changes such that the sections of the received signal corresponding to the time sections B and D are of equal amplitude at inputs of the first comparator, comparing, via a further comparator, a portion of the received signal corresponding to time section A with a portion of the received signal corresponding to time section C, and outputting, via the further comparator, a second comparison value indicative of a phase difference between the first inductive temporal field changes and the further inductive temporal field changes, inputting the second comparison value to the phase shifter which regulates the phase difference to zero by changing a phase delay of one of the first inductive temporal field changes and the further inductive temporal field changes and causing the portions of the received signal corresponding to the time sections A and C to be equal in amplitude at inputs of the further comparator, the phase shifter outputting a phase shift signal indicative of the phase delay, using the phase shift signal indicating the phase delay occurring at the phase difference being zero to determine the propagation time of the field changes as a a result of an influence by an object on at least one of the first inductive temporal field changes and the further inductive temporal field changes.

2. A device to measure influence of a propagation time of inductive fields comprising:

a clock pulse control system configured to generate an alternating signal at a clock rate;

a sending coil located in a sensor-active region, the sending coil configured to receive the alternating signal and generate first inductive temporal field changes at the clock rate, the first inductive temporal field changes including consecutive time sections A and B, an inverter configured to receive the alternating signal from the clock pulse control system and to invert the alternating signal to generate an inverted signal;

a further coil configured to receive the inverted signal and generate further inductive temporal field changes at the clock rate, the further inductive temporal field changes including consecutive time sections C and D, a receiving coil configured to detect the first and further inductive temporal field changes, and output a received signal based on the first and second inductive temporal field changes, a plurality of switches configured to receive the received signal and that are switched at the clock rate by the clock pulse control system to divide the received signal into portions corresponding to the time sections A, B, C, D, a first comparator configured to compare a portion of the received signal corresponding to the time section B, with a portion of the received signal corresponding the time section D, and to generate a first comparison value;

an amplitude controller in signal communication with the first comparator, the amplitude controller configured to regulate amplitude values of at least one of the first inductive temporal field changes or the further inductive temporal field changes based on the first comparison value such that the portions of the received signal corresponding to the time sections B and D are of equal amplitude at inputs of the first comparator, a further comparator configured to compare a portion of the received signal corresponding to the time section A with a portion of the received signal corresponding to the time section C, and to output a second comparison value indicative of a phase difference between the first inductive temporal field changes and the further inductive temporal field changes, a phase shifter in signal communication with the further comparator to receive the second comparison value and based on the second comparison value, is configured to regulate the phase difference to zero by changing a phase delay of one of the first inductive temporal field changes and the further inductive temporal field changes, and is configured to cause the portions of the received signal corresponding to the time sections A and C to be equal in amplitude at inputs of the further comparator, the phase shifter outputting a phase shift signal indicative of the phase delay occurring at the phase difference being zero where the phase delay is a a result of an influence by an object on at least one of the first inductive temporal field changes and the further inductive temporal field changes.

* * * * *